Oct. 27, 1925.

L. STRAUSS 1,558,715

ATTACHMENT FOR OPHTHALMIC MOUNTINGS

Filed Oct. 30, 1924

INVENTOR.
Leopold Strauss.
BY Barlow + Barlow
ATTORNEYS.

Patented Oct. 27, 1925.

1,558,715

UNITED STATES PATENT OFFICE.

LEOPOLD STRAUSS, OF NEW YORK, N. Y., ASSIGNOR TO OPTICAL PRODUCTS CORPORATION, OF NEW YORK, N. Y., A CORPORATION OF NEW YORK.

ATTACHMENT FOR OPHTHALMIC MOUNTINGS.

Application filed October 30, 1924. Serial No. 746,766.

*To all whom it may concern:*

Be it known that I, LEOPOLD STRAUSS, a citizen of the United States, residing at New York city, in the county of New York and State of New York, have invented certain new and useful Improvements in Attachments for Ophthalmic Mountings, of which the following is a specification.

This invention relates to an improved attachment for ophthalmic mounting; and has for its object to provide a supplemental lens adapted to be detachably connected to a permanent mounting for the purpose of diffusing or distributing excessively harsh or glaring rays of light from affecting the eyes of the wearer such as when colored glasses are worn in unusually bright sunshine or for any other purpose for which these lenses may be employed.

A further object of my invention is the connecting together of a pair of supplemental lenses by a spring bridge member and providing each of the lenses with engaging members at their outer edges adapted to be clamped by tension of the bridge on to the permanent mounting.

With these and other objects in view, the invention consists of certain novel features of construction, as will be more fully described, and particularly pointed out in the appended claims.

In the accompanying drawings:—

It is found in practice by wearers of ophthalmic mountings, at times, of advantage to be able to apply a pair of supplemental colored lenses for the purpose of preventing harsh or glaring rays of light from affecting the eyes and that without removing his permanent lenses which are necessary to be also worn in order to correct his vision, and it is found of advantage in the construction of such supplemental lenses to connect these lenses together by a spring bridge member and to provide on the opposite outer rims of the lens, hooks or engaging members which may be caused, under tension of spring bridge member, to grip and be clamped to the outer edges of these rims to firmly retain these supplementary lenses in position on the permanent lenses; and the following is a detailed description of the present embodiment of my invention showing one means by which these advantageous results may be accomplished:—

Figure 1:
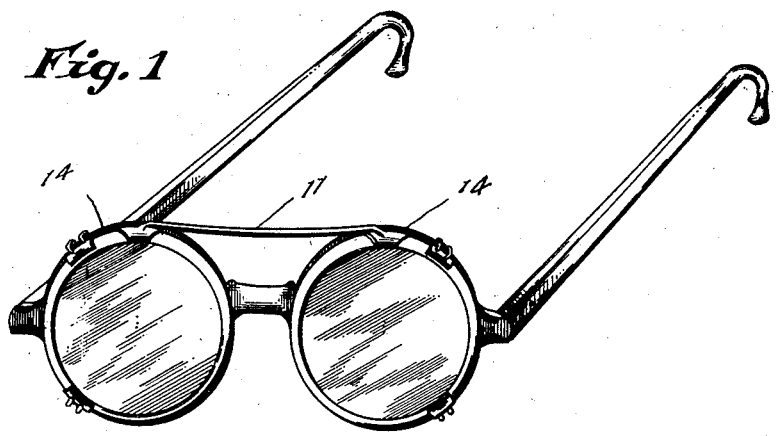
Figure 1 is a perspective view illustrating a pair of my improved supplemental lenses as applied to a permanent mounting.
Figure 2:
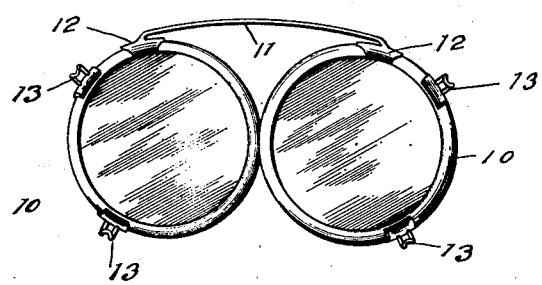
Figure 2 is a front view illustrating a pair of my supplemental lenses as having their lens rims connected together by a spring bridge, the rims being provided with attaching members.

With reference to the drawing, 10 designates a pair of non-metallic lens rims which are connected by a metallic bridge 11 clamped as at 12 to the non-metallic rims. In Figure 2 is also shown a pair of hook-shaped engaging members 13 secured in widely-separated position on opposite sides of a common horizontal axis through these lenses. These hook-shaped members are adapted to engage the rims 14 of the permanent lenses and cause them to grip and clamp the supplemental lenses to these permanent lenses by tension of the bridge 11, thereby firmly securing these supplemental lenses to the rims of the permanent mounting.

Figure 3:
Figure 3 is a perspective view illustrating a wire loop in hook shape adapted to be applied to a non-metallic lens rim.
Figure 4:
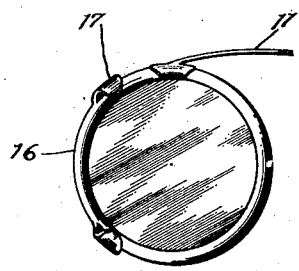
Figure 4 is a modified construction showing a non-metallic lens rim having non-metallic hooks formed integrally therewith.
Figure 5:
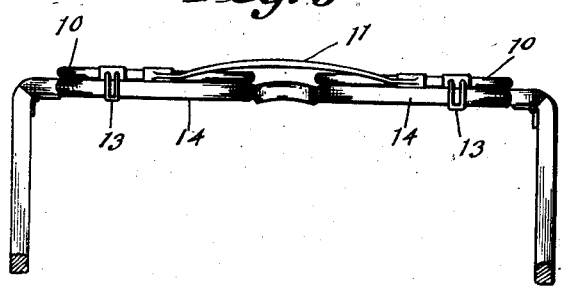
Figure 5 is a top edge view illustrating my improved supplemental lens as connected to a permanent mounting and held in position thereon by spring pressure of the bridge member.

In some instances, I form the hook-shaped members 13 of a wire loop, as illustrated in Figure 3, the ends of the loop being secured to the short metal clamping section 15 which is adapted to fit over the non-metallic lens rim 10 of the supplemental lenses. These wire loops are preferably formed of bendable metal so they can be extended by being pressed together and so bent and shaped to engage lens rims of different thicknesses, which is found in some cases, to be necessary.

In some cases instead of forming the hook members 13 of wire, I form hook members 17 integral with the outer edge of the lens rim 16, and of the same non-metallic material of which the rim is formed, which construction has the advantage of being less conspicuous than the metal hooks illustrated in Figure 2.

By the use of my improved supplemental lenses which are connected by a metallic bridge member any desired color or character of lenses may be mounted therein and can be very readily applied to the regular or permanent mounting, and the spring bridge serves to firmly clamp them in position thereon and that by separating the engaging hooks on these lens rims the spring of the bridge serves to retain these lenses and securely bind them against movement when positioned on the permanent rims.

Also by the use of my improved spring bridge on the supplemental mounting for connecting together its lenses, this mounting may be caused to readily fit permanent mountings having lenses of different diameters and of widely different pupillary distances.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An attachment for ophthalmic mountings, comprising a pair of supplemental lenses, a spring bridge member connected at its opposite end portions to their upper edges and normally tending to bow outwardly each lens having engaging members at its outer edges adapted to be clamped by tension of said bridge onto the permanent mounting.

2. An attachment for ophthalmic mountings, comprising a pair of supplemental lenses, a resilient bridge member clamped at its opposite ends to their upper edges, each lens having widely spaced engaging members at their outer edges on either side of a medial transverse line through both lenses adapted to be clamped by tension of said bridge to the permanent mounting.

3. An attachment for ophthalmic mountings, comprising a pair of supplemental lenses, a metallic bow spring connected at its opposite end portions to their upper edges, each lens having widely spaced apart engaging hooks at its outer edges adapted to be clamped by tension of said spring to the adjacent edges of the permanent mounting.

4. An attachment for ophthalmic mountings, comprising a pair of supplemental lenses, a resilient metal bridge connected at its opposite end portions to their upper edges, each lens having engaging hooks formed of wire loops secured at their outer edges, said loops being of bendable material and adapted to be shaped to fit lens rims of different thicknesses and be clamped by tension of said bridge on to the permanent mounting.

5. An attachment for ophthalmic mountings, comprising a pair of supplemental lenses having non-metallic lens rims, a resilient metallic bow-shaped bridge connected to their upper edges, each lens rim having engaging hooks formed of wire loops secured at their outer edges, said loops being of bendable material and adapted to be shaped and adjusted to fit the permanent lens rims of different thicknesses and be clamped by the outwardly bowing tension of said bridge on to the permanent mounting.

In testimony whereof I affix my signature.

LEOPOLD STRAUSS.